(12) United States Patent
Norton et al.

(10) Patent No.: US 7,771,512 B2
(45) Date of Patent: Aug. 10, 2010

(54) APPARATUS WITH HIGH SURFACE AREA NANOSTRUCTURES FOR HYDROGEN STORAGE, AND METHODS OF STORING HYDROGEN

(75) Inventors: Grant Norton, Pullman, WA (US); David McIlRoy, Moscow, ID (US)

(73) Assignees: Washington State University Research Foundation, Pullman, WA (US); Idaho Research Foundation, Inc., Moscow, ID (US)

(*) Notice: Subject to any disclaimer, the term of this patent is extended or adjusted under 35 U.S.C. 154(b) by 263 days.

(21) Appl. No.: 11/961,928

(22) Filed: Dec. 20, 2007

(65) Prior Publication Data

US 2009/0000192 A1 Jan. 1, 2009

Related U.S. Application Data

(63) Continuation-in-part of application No. PCT/US06/24435, filed on Jun. 23, 2006.

(60) Provisional application No. 60/876,646, filed on Dec. 22, 2006, provisional application No. 60/744,733, filed on Apr. 12, 2006, provisional application No. 60/693,683, filed on Jun. 24, 2005.

(51) Int. Cl.
*B01D 53/02* (2006.01)

(52) U.S. Cl. .................. 95/116; 96/146; 96/154; 502/526; 977/948

(58) Field of Classification Search .......... 95/90, 95/116, 148, 900; 96/108, 143, 146, 154; 502/400, 407, 526; 977/768, 988; 206/0.7
See application file for complete search history.

(56) References Cited

U.S. PATENT DOCUMENTS

| | | | |
|---|---|---|---|
| 6,297,063 B1 | 10/2001 | Brown et al. | |
| 6,638,348 B2* | 10/2003 | Kuriiwa et al. | 96/146 |
| 6,672,077 B1 | 1/2004 | Bradley et al. | |
| 6,709,497 B2* | 3/2004 | Myasnikov et al. | 96/126 |
| 6,858,521 B2 | 2/2005 | Jin | |
| 6,991,773 B2 | 1/2006 | Jhi et al. | |
| 7,323,043 B2* | 1/2008 | Finamore | 96/146 |
| 7,326,281 B2* | 2/2008 | Fujita et al. | 96/108 |
| 7,425,232 B2* | 9/2008 | Wang et al. | 96/154 |
| 2003/0167778 A1* | 9/2003 | Bradley et al. | 62/46.1 |

(Continued)

FOREIGN PATENT DOCUMENTS

WO 2007002369 A2 1/2007

OTHER PUBLICATIONS

International Search Report and Written Opinion for PCT/US2006/024435, Apr. 9, 2007.

(Continued)

*Primary Examiner*—Frank M Lawrence
(74) *Attorney, Agent, or Firm*—Perkins Coie LLP

(57) ABSTRACT

Method and apparatus for storing hydrogen. One embodiment of such a method comprises providing a storage apparatus having a substrate and a nanostructure mat on at least a portion of a side of the substrate. The nanostructure mat comprises a plurality of nanostructures having a surface ionization state which causes more than one layer of hydrogen to adsorb onto the nanostructures. The method can also include exposing the nanostructure mat to hydrogen such that more than one layer of hydrogen adsorbs onto the nanostructures.

28 Claims, 8 Drawing Sheets

U.S. PATENT DOCUMENTS

| | | | |
|---|---|---|---|
| 2004/0023087 A1 | 2/2004 | Redmond | |
| 2004/0112964 A1 | 6/2004 | Empedocles et al. | |
| 2004/0265212 A1* | 12/2004 | Varadan et al. | 423/447.3 |
| 2005/0077496 A1* | 4/2005 | Shimizu et al. | 252/184 |
| 2007/0092437 A1* | 4/2007 | Kwon et al. | 423/658.2 |

OTHER PUBLICATIONS

International Search Report and Written Opinion for International Application No. PCT/US2007/088438, Oct. 20, 2008.

Wang, L. et al., "High yield synthesis and lithography of silica-based nanospring mats," Nanotechnology, vol. 17, pp. S298-S303, May 19, 2006, abstract only, URL: <http://www.iop.org/EJ/abstract/0957-4484/17/11/S12>.

Beaux, M., Wang, L., Zhang, D., Gangadean, D., McIlroy, D., Kwon, N., Dziewanowska, K. and Bohach, G., Fibronectin Bonding to Nanowires and Their Internalization by Epithelial Cells, J. of Biomedical Nanotechnology 2 (2006).

Bekyarova, E., Ni, Y., Malarkey, E., Montana, V., McWilliams, J., Haddon, R. and Parpura, V., Applications of Carbon Nanotubes in Biotechnology and Biomedicine, J. of Biomedical Nanotechnology 1 3 (2005).

Bell, A.T. The impact of nanoscience on heterogeneous catalysis. Science 299, 1688 (2003).

Boudjahem, A-G., S. Monteverdi, M. Mercy, D. Ghanbaja and M.M. Bettahar. Nickel nanoparticles supported on silica of low surface area: Hydrogen chemisorption and TPD and catalytic properties. Catal. Lett. 84, 115 (2002).

Campbell, C.T. The active site in nanoparticle gold catalysis. Science 306, 234 (2004).

Che, G., B.B. Lakshrni, C.R. Martin and E.R. Fisher. Metal-nanocluster-filled carbon nanotubes: Catalytic properties and possible applications in electrochemical energy storage and production. Langmuir 15, 750 (1999).

Chen, P. et al. Interaction of hydrogen with metal nitrides and imides, Nature 420 21, 302-304, Nov. 2002.

Chen, P., X. Wu, J. Lin, and K.L. Tan. High H2 uptake by alkali-doped carbon nanotubes under ambient pressure and moderate temperatures. Science 285, 91 (1999).

Compagnini, G., A.A. Scalisi, O. Puglisi, and C. Spinella. Synthesis of gold colloids by laser ablation in thiol-alkane solutions. J. Mater. Res. 19, 2795 (2004).

Crabtree, G.W. et al. The Hydrogen Economy, Physics Today, 57, 39-44, Dec. 2004.

Dalacu, D. and Martinu, L., Spectroellipsometric characterization of plasma-deposited Au/SiO2 nanocomposite films, J. Appl. Phys. 87 228 (2000).

Dalacu, D. and Martinu, L., Temperature dependence of the surface plasmon resonance of Au/SiO2 nanocomposite films, Appl. Phys. Lett. 77 4283 (2000).

Darkrim, F.L. et al. Review of hydrogen storage by adsorption in carbon nanotubes, International Journal of Hydrogen Energy 27 (2002) 193-202.

Department of Energy, Office of Science, Argonne National Laboratory: Basic Research Needs for the Hydrogen Economy, 2003.

Dillon, A.C., K.M. Jones, T.A. Bekkedahl, C.H. Klang, D.S. Bethune, and M.J. Heben. Storage of hydrogen in single-walled carbon nanotubes. Nature (London) 386, 377 (1997).

Dobrokhotov V, McIlroy, D, Norton G, Abuzir, M, Yeh, A, Stevenson J, Pouy I, Bochenek R, Cartwright M, Wang L, Dawson J, Beaux M and Berven C, Principles and mechanisms of gas sensing by GaN nanowires functionalized with gold nanoparticles, J. Appl. Phys. 99, 104302 (2006).

Duan, X., Wang, J. and Lieber, C.M., Synthesis and optical properties of gallium arsenide nanowires, Appl. Phys. Lett. 76 1116 (2000).

Fukuoka, A., Araki, H., Kimura, J., Sakamoto, Y., Higuchi, T., Sugimoto, N., Inagaki, S., and Ichikawa, M., Template synthesis of nanoparticle arrays of gold, platinum, and palladium in mesoporous silica films and powders, J. Mater. Chem. 14, 752 (2004).

Guczi, L., G. Petoe, A. Beck, K. Frey, O. Geszti, G. Molnar, and C. Daroczi. Gold nanoparticles deposited on SiO2/Si (100): Correlation between size, electron structure, and activity in CO oxidation. J. Am. Chem. Soc. 125, 4332 (2003).

Gutierrez-Wing, C., J.A. Ascencio, M. Perez-Alvarez, M. Marin-Almazo, and M. Jose-Yacaman. On the structure and formation of self-assembled lattices of gold nanoparticles. J. Cluster Sci. 9, 529 (1998).

Han, L., W. Wu, F.L. Kirk, J. Luo, M.M. Maye, N.N. Kariuki, Y. Lin, C-M. Wang, and C-J. Zhong. A Direct Route toward Assembly of Nanoparticle-Carbon Nanotube Composite Materials. Langmuir 20, 6019 (2004).

Haruta, M. Size- and support-dependency in the catalysis of gold. Catal. Today. 36, 153 (1997).

Haruta, M. When gold is not noble: catalysis by nanoparticles. Chem. Rec. 3, 75 (2003).

He, Z., J. Chen, D. Liu, H. Tang, W. Deng & Y. Kuang. Deposition and electrocatalytic properties of platinum nanoparticles on carbon nanotubes for methanol electrooxidation. Mater Chem. Phys. 85, 396 (2004).

Hirscher, M. et al. Are carbon nanostructures an efficient hydrogen storage medium? Journal of Alloys and Compounds 356-357 (2003) 433-437.

Hostetler, M.J., J.E. Wingate, C-J Zhong, J.E. Harris, R.W. Vachet, M.R. Clark, J.D. Londono, S.J. Green, J.J. Stokes, G.D. Wignall, G.L. Glish, M.D. Porter, N.D. Evans, and R.W. Murray. Alkanethiolate gold cluster molecules with core diameters from 1.5 to 5.2 nm: Core and monolayer properties as a function of core size. Langmuir 14, 17 (1998).

Ivanova, S., C. Petit, and V. Pitchon. A new preparation method for the formation of gold nanoparticles on an oxide support. Appl. Catal., A: General 267, 191 (2004).

Jhi, S-H., and Y-K. Kwon. Glassy materials as a hydrogen storage medium: Density functional calculations, Phys. Rev. B. 71, 035408 (2005).

Jhi, S-H., and Y-K. Kwon. Hydrogen adsorption on boron nitride nanotubes: A path to room temperature hydrogen storage. Phys. Rev. B 69, 245407 (2004).

Jhi, S-H., Y-K. Kwon, K. Bradley, and J-C.P. Gabriel. Hydrogen storage by physisorption: Beyond carbon. Solid State Comm. 129, 769 (2004).

Jiang, L., and L. Gao. Modified carbon nanotubes: an effective way to selective attachment of gold nanoparticles. Carbon 41, 2923 (2003).

Kovtyukhova N., Martin B, Mbindyo J, Smith P, Razavi B, Mayer T and Mallouk T, 2001, Layer-by-Layer Assembly of Rectifying Junctions in and on Metal Nanowires, J. Phys.Chem. B 105 8762.

LaLonde, A.D. et al., Metal coatings on SiC nanowires by plasma-enhanced chemical vapor deposition, J. Mater. Res., 20, 549 (2005).

LaLonde, A.D., et al., Controlled growth of gold nanoparticles on silica nanowires, J. Mater. Res., 20, 3021 (2005).

Leng, H.Y. et al. New Metal-N-H System Composed of Mg(NH2)2 and LiH for Hydrogen Storage, J. Phys. Chem. B 108 26, 8763-8765 (2004).

Liu, C., Y.Y. Fan, M. Liu, H.T. Cong, H.M. Cheng, and M.S. Dresselhaus. Hydrogen storage in single-walled carbon nanotubes at room temperature. Science 286, 1127 (1999).

Liu, Z., L.M. Gan, L. Hong, W. Chen & J.Y. Lee. Carbon-supported Pt nanoparticles as catalysts for proton exchange membrane fuel cells. J. Power Sources 139, 73 (2005).

Ma, X., N. Lun, and S. Wen. Formation of gold nanoparticles supported on carbon nanotubes by using an electroless plating method. Diamond & Relat. Mater. 14, 68 (2005).

Magnusson, M.H., K. Deppert, J-O. Maim, J-O. Bovin, and L. Samuelson. Gold nanoparticles: Production, reshaping, and thermal charging. J. Nanoparticle Res. 1, 243 (1999).

Marella, M. et al. Synthesis of carbon nanofibers and measurements of hydrogen storage, Carbon (2006) 1404-1413.

Matsumoto, T., T. Komatsu, H. Nakano, K. Arai, Y. Nagashima, E. Yoo, T. Yamazaki, M. Kijima, H. Shimizu, Y. Takasawa and J. Nakamura. Efficient usage of highly dispersed Pt on carbon nanotubes for electrode catalysts of polymer electrolyte fuel cells. Catal. Today 90, 277 (2004).

McIlroy, D., Zhang, D. and Kranov, Y., Nanosprings, Appl. Phys. Lett. 79 1540 (2001).

McIlroy, D.N., A. Alkhateeb, D. Zhang, D.E. Aston, A.C. Marcy, and M.G. Norton. Nanospring formation—unexpected catalyst mediated growth. J. Phys.: Condens. Matter 16, R415 (2004).

McIlroy, D.N., D. Zhang, R.M. Cohen, J. Wharton, Y. Geng, M.G. Norton, G. De Stasio, B. Gilbert, L. Perfetti, J.H. Streiff, B. Broocks, and J.L. McHale. Electronic and dynamic studies of boron carbide nanowires. Phys. Rev. B 60, 4874 (1999).

Mpourmpakis, G. et al. SiC Nanotubes: A Novel Material for Hydrogen Storage, Nano Letters, Vo. 6, No. 8, pp. 1581-1583, Aug. 2006.

Office Action (translation) issued Dec. 25, 2009 in People's Republic of China Application No. 200680022817.2.

Office Action (translation) issued Nov. 30, 2009 in Korea Application No. 10-2008-7001985.

Okamoto, H. and Massalski, T., The Au-Si (Gold-Silicon) System, Bull. Alloy Phase Diagrams 4 2 (1983).

Okumura, M., S. Nakamura, S. Tsubota, T. Nakamura, M. Azuma, and M. Haruta. Chemical vapor deposition of gold on Al2O3, SiO2, and TiO2 for the oxidation of CO and of H2. Catal. Lett. 51, 53 (1998).

Panigrahi, S., S. Kundu, S.K. Ghosh, S. Nath, and T. Pal. General method of synthesis for metal nanoparticles. J. Nanoparticle Res. 6, 411 (2004).

Pinkerton, F.E. et al. Hydrogen Desorption Exceeding Ten Weight Percent from the New Quarterly Hydride Li3BN2H8, J. Phys. Chem. B, vol. 109, No. 1, pp. 6-8, 2005.

Pol, V.G., A. Gedanken, and J. Calderon-Moreno. Deposition of gold nanoparticles on silica spheres: A sonochemical approach. Chem. Mater. 15, 1111 (2003).

Salem, A., Searson, P. and Leong, K., Multifunctional nanorods for gene delivery, Nat. Mater. 2 668 (2003).

Satishkumar, B.C., E.M. Vogl, A. Govindaraj, and C.N.R. Rao. The decoration of carbon nanotubes by metal nanoparticles. J. Phys. D: Appl. Phys. 29, 3173 (1996).

Schimpf, S., M. Lucas, C. Mohr, U. Rodemerck, A. Brüickner, J. Radnik, H. Hofmeister, and P. Claus. Supported gold nanoparticles: in-depth catalyst characterization and application in hydrogenation and oxidation reactions. Catal. Today 72, 63 (2002).

Shen, D., Chen, D., Tang, K., Qian, Y. and Zhang, S., Silicon carbide hollow nanospheres, nanowires and coaxial nanowires, Chem. Phys. Lett. 375 177 (2003).

Tang, H., J. Chen, L. Nie, D. Liu, W. Deng, Y. Kuang and S. Yao. High dispersion and electrocatalytic properties of platinum nanoparticles on graphitic carbon nanofibers (GCNFs). J. Colloid Interface Sci. 269, 26 (2004).

Tang, Z., Kotov, N. and Giersig, M., Spontaneous Organization of Single CdTe Nanoparticles into Luminescent Nanowires, Science 297 237 (2002).

Taubert, A., U-M. Wiesler, and K. Muellen. Dendrimer-controlled one-pot synthesis of gold nanoparticles with a bimodal size distribution and their self-assembly in the solid state. J. Mater. Chem. 13, 1090 (2003).

Wagner, R. and Ellis, W., Vapor-Liquid-Solid Mechanism of Single Crystal Growth, Appl. Phys. Lett. 4 89 (1964).

Wang, J., T. Zhu, J. Song, and Z. Liu. Gold nanoparticulate film bound to silicon surface with self-assembled monolayers. Thin Solid Films 327-329, 591 (1998).

Wu, S.H., and D-H. Chen. Synthesis and characterization of nickel nanoparticles by hydrazine reduction in ethylene glycol. J. Colloid Interface Sci. 259, 282 (2003).

Wu, Y. and Yang, P., Direct Observation of Vapor-Liquid-Solid Nanowire Growth, J. Am. Chem. Soc. 123 3165 (2001).

Zhang Y., Q. Zhang, Y. Li, N. Wang and J. Zhu. Coating of carbon nanotubes with tungsten by physical vapor deposition. Solid State Commun. 115, 51 (2000).

Zhang, D., Alkhateeb, A., Han, H., Mahmood, H. and McIlroy, D., Silicon Carbide Nanosprings, Nano Lett. 3 983 (2003).

Zhang, D., D.N. McIlroy, Y. Geng, and M.G. Norton. Growth and characterization of boron carbide nanowires. J. Mater. Sci. Letters 18, 349 (1999).

Zhang, H-F., C-M. Wang, E.C. Buck, and L-S. Wang. Synthesis, characterization, and manipulation of helical SiO2 nanosprings. Nano Lett. 3, 577 (2003).

Zheng, M., Zhang, L., Li, G., Zhang, X. and Wang, X., Ordered indium-oxide nanowire arrays and their photoluminescence properties, Appl. Phys. Lett. 79 839 (2001).

Zuttel, A. Hydrogen storage in carbon nanostructures, International Journal of Hydrogen Energy 27 (2002) 203-212.

* cited by examiner

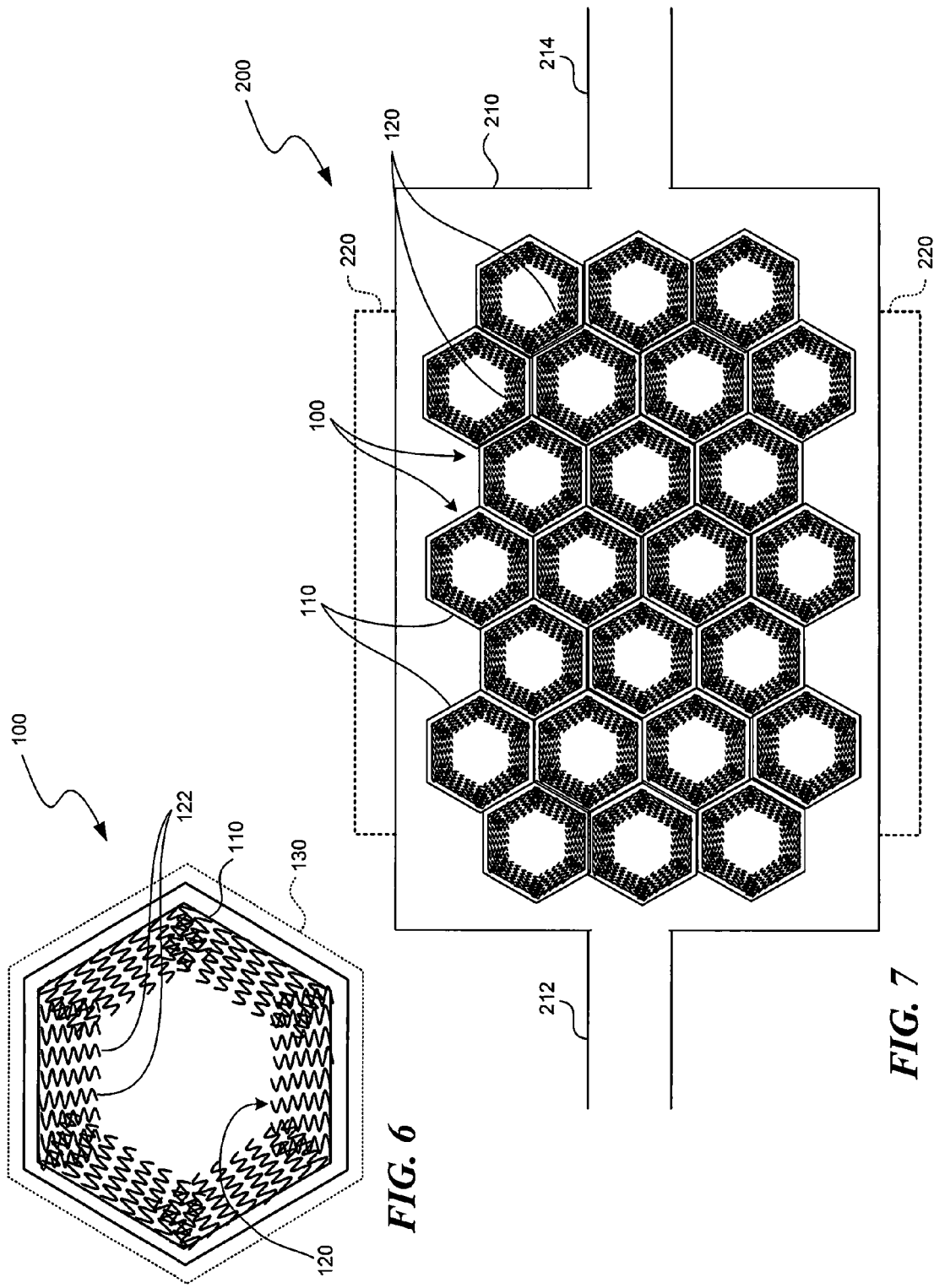

APPARATUS WITH HIGH SURFACE AREA NANOSTRUCTURES FOR HYDROGEN STORAGE, AND METHODS OF STORING HYDROGEN

CROSS-REFERENCE TO RELATED APPLICATION(S)

The present application claims the benefit of U.S. Provisional Application No. 60/876,646, filed on Dec. 22, 2006, and the present application is a continuation-in-part of International Application No. PCT/US06/024435, filed on Jun. 23, 2006, and entitled Method for Manufacturing and Coating of Nanostructured Components, which claims the benefit of U.S. Provisional Application Nos. 60/744,733 filed on Apr. 12, 2006 and 60/693,683 filed on Jun. 24, 2005, all of which are incorporated herein by reference.

STATEMENT REGARDING FEDERALLY SPONSORED RESEARCH AND DEVELOPMENT

The invention was funded, in part, by the National Science Foundation under Idaho EPSToR grant EPS0132626. The United States government has certain rights in the invention.

TECHNICAL FIELD

The present invention relates to the use of nanostructures having high surface areas with desirable ionic properties for storing hydrogen.

BACKGROUND

The energy crisis of the 1970's has reemerged as a global issue with an increase in competition for existing oil resources. Rising standards of living, increased industrialization, and a growing worldwide population are driving this competition. Among the various alternative energy strategies, a hydrogen-based energy infrastructure is a particularly promising approach that offers several advantages. First, hydrogen is the third most abundant element and offers the highest energy density per unit weight of any known fuel. The heat of combustion for $H_2$ (125 MJ/kg), for example, is about 300% greater than that of gasoline (43 MJ/kg). Second, hydrogen is the lightest element and would therefore enhance efficiency by reducing fuel storage weight relative to petroleum fuels. Third, hydrogen is also a renewable resource and can be produced from a variety sources, such as steam reforming of natural gas, electrolysis of water, and photosynthesis of $CO_2$, $H_2O$ and sunlight to $H_2$ and $O_2$. Fourth, hydrogen is environmentally friendly and may lead to reducing greenhouse gas emissions because water is the byproduct of a hydrogen combustion engine or a hydrogen fuel cell.

One significant challenge of implementing a hydrogen-based energy infrastructure is storing hydrogen in sufficient quantities for transportation and other widespread applications. For example, high pressure storage of hydrogen for such applications is impractical because hydrogen ignites at atmospheric pressures in concentrations as low as about 4% by volume. One alternative to high-pressure storage of $H_2$ is cryogenic liquification. Although liquification of hydrogen clearly has advantages over high-pressure storage, such as a higher energy density and the ability to operate at atmospheric pressure, it is not practical because the energy loss of liquefying hydrogen and prolonged cryogenic cooling can be as high as 40% (Crabtree, et al. *Physics Today* 57, 39, 2004). Another alternative to high pressure storage is combining hydrogen with metals in the form of metal hydrides. Some light metals, such as magnesium and lithium, react with hydrogen to produce metal hydrides that can later release high purity hydrogen similar to water in a sponge. The total adsorbed hydrogen is generally 1%-2% in gravimetric density (ratio of adsorbed $H_2$ mass to the total mass), and in some cases storage densities as high as 5%-7% have been reported (Chen, et al., *Nature* 420, 302, 2002; Leng et al., *J. Phys. Chem. B* 108, 8763, 2004; Pinkerton, et al., *J. Phys. Chem. B* 109, 6, 2005). Metal hydrides, however, are not practical in many applications because high temperatures (~300° C.) are needed to achieve sufficient rates of hydrogen release (Crabtree, et al. *Physics Today* 57, 39, 2004).

Another alternative for storing hydrogen is to adsorb hydrogen onto the surfaces of nanomaterials that facilitate low temperature desorption. Lightweight nanomaterials (e.g. nanotubes, nanohorns, and other row one and row two main group structures) have high surface area to weight ratios that can achieve high storage densities, but as indicated in a recent Department of Energy (DOE) report, the maximum storage of adsorped hydrogen is currently only 4.1% (Department of Energy, Office of Science, Argonne National Laboratory: *Basic Research Needs for the Hydrogen Economy*, 2003). To meet even the 2010 hydrogen storage target of 6%, multilayer adsorption of $H_2$ is desirable (Department of Energy, Office of Science, Argonne National Laboratory: *Basic Research Needs for the Hydrogen Economy*, 2003). Several groups have investigated the use of different types of nanostructured carbon, such as activated carbon, nanotubes, and nanofibers, for hydrogen uptake (Dillon, et al., *Nature* 386, 377, 1997; Züttel, et al., *Int. J. Hydrogen Energy* 27, 203, 2002; Lamari, et al., *Int. J. Hydrogen Energy* 27, 193, 2002; Hirscher, et al., *J. Alloys Compd.* 356-357, 433, 2003). However, carbon nanostructures have several limitations including cryogenic desorption temperatures and low adsorption rates at room temperature. In the case of carbon nanotubes, hydrogen capacity rates have been difficult to reproduce/confirm as noted by the reported gravimetric storage capacities ranging from 0.25% to an unrealistic 20% (Chen, et al., *Science* 285, 91, 1999; Mpourmpakis, et al., *Nano Lett.* 6, 1581, 2006; Marella, et al., *Carbon* 44, 1404 2006).

Oxide ceramics may represent an alternative to carbon-based materials for hydrogen storage applications. It has been suggested in the art that ceramic oxide nanostructures (e.g. nanotubes and other materials with nanoscale structures) may provide alternative compositions for use in storage. However, little data and few examples have been provided to yield sufficient information to predict suitable compositions (Bradley, et al, U.S. Pat. No. 6,672,077). Theoretical studies have indicated that vitreous boron oxide ($B_2O_3$) exhibits suitable surface properties for $H_2$ storage (Jhi, et al, *Phys. Rev. B* 69, 245407, 2005; Jhi, et al., *Phys. Rev. B* 71, 035408, 2005). Some experimental support exists for the use of boron oxide derivatives to store hydrogen, but these also reportedly have cryogenic desorption temperatures that limit practical utility (Jhi, et al, U.S. Pat. No. 6,991,773). These investigations suggest the possibility for use of boron oxide ceramics in hydrogen storage applications based upon the energetics of the $H_2$—$B_2O_3$ interactions, but many practical requirements remain to be solved. Specifically, methods that reliably produce materials which have both a high surface area and high degree of surface accessibility are limitations to the realization of materials with the desired characteristics for hydrogen storage applications. Moreover, it would be desirable to develop a material that induces multilayer adsorption of hydrogen. As a result, there is a need to further develop and explore new material structures and compositions for storing hydrogen.

BRIEF DESCRIPTION OF THE DRAWINGS

FIG. 6 is a schematic cross-sectional view of an apparatus with high surface area nanostructures for storing hydrogen in accordance with an embodiment of the invention.

FIG. 7 is a schematic cross-sectional view of a system having apparatus with high surface area nanostructures for storing hydrogen in accordance with an embodiment of the invention.

DETAILED DESCRIPTION

A. Overview

Figure 1:
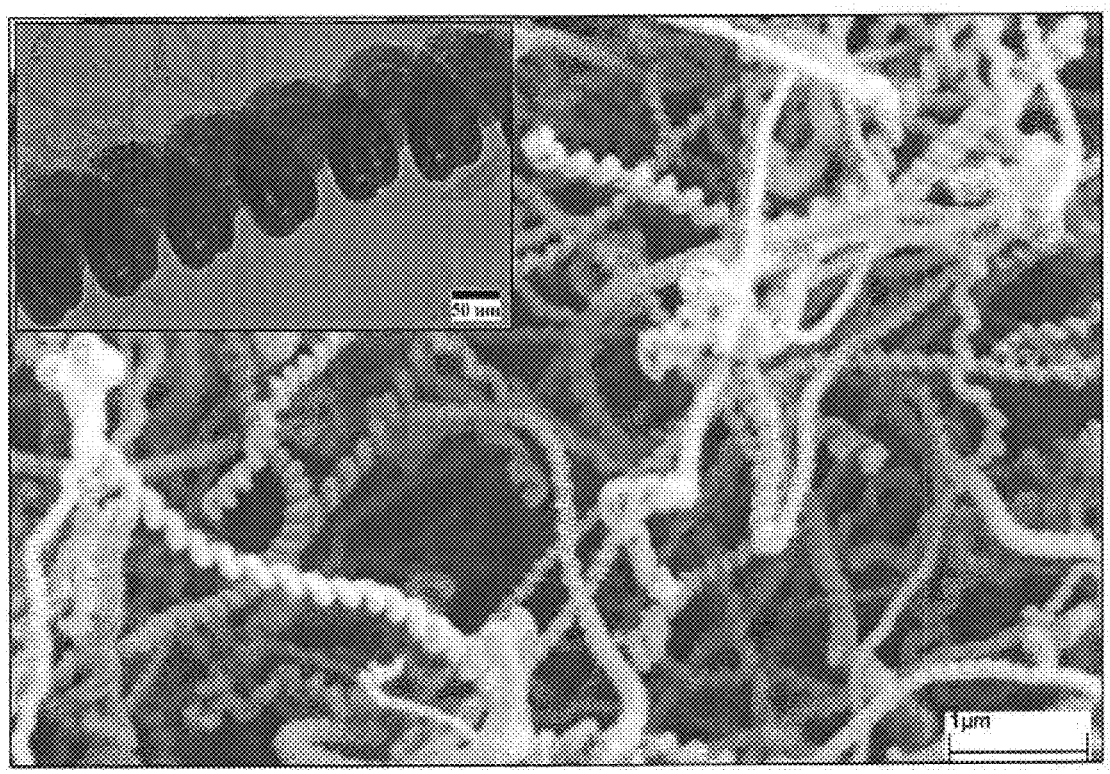
FIG. 1 is an SEM image of as-grown silica nanosprings in which the inset is a bright-field TEM image of an individual silica nanospring that shows an embodiment formed from multiple, intertwined nanowires.

In International Application No. PCT/US06/024435 the present inventors described methods to grow nanostructures onto the surface of substrate materials. The nanostructures formed by these methods can have several different compositions and be used in many different applications. Several embodiments of the present invention are directed to nanostructures composed of glass, ceramic and/or ceramic oxide materials to store or sequester hydrogen. The nanostructures can be formed on a substrate according to one or more of the methods disclosed in International Application No. PCT/US06/024435. In several embodiments, one aspect of the nanostructures is that they provide controlled, reversible multilayered hydrogen adsorption.

Several methods disclosed in International Application No. PCT/US06/024435 can be used to produce at least substantially continuous mats of nanostructures ('nanostructure mats') on substrate surfaces. The nanostructures can comprise either nanosprings and/or nanowires composed of glass (e.g., $SiO_2$), ceramic (e.g., SiC, BN, $B_4C$, $Si_3N_4$), or ceramic oxide (e.g., $Al_2O_3$, $B_2O_3$, $ZrO_2$) materials. Many embodiments of the nanostructure mats have high surface areas (~200 $m^2/g$) that are also highly accessible. The nanostructure mats may be formed on any suitable substrate surface capable of withstanding the conditions required for growing the nanostructures (e.g., temperatures of approximately 300-400° C. and the chemical properties of the precursors).

One embodiment utilizes nanostructure mats comprising silica glass ($SiO_2$) nanosprings with high surface areas and unique surface stoichiometry that provides nondissociative storage of hydrogen. As a result, multiple layers of hydrogen molecules adsorb at liquid nitrogen temperatures, and more importantly at normal ambient temperatures. Also, at least nearly complete desorption occurs at moderate temperatures (e.g., 100° C.), and partial or controlled desorption can be provided by controlling the temperature of the nanostructure mats at less than complete desorption temperatures. Moreover, the silica nanosprings can be formed at temperatures as low as 300° C. such that they can be grown on polymer substrates; this enables silica nanostructure mats to be formed in large-surface-area structures that enable practical storage of hydrogen.

B. Embodiments of Nanostructure Mats

Several embodiments of the nanostructure mats composed of glass, ceramic and/or ceramic oxide materials provide a viable approach for hydrogen storage applications. The contiguous or continuous mats of nanostructures can be grown on at least part of a substrate surface such that the nanostructures provide a high surface area that is also highly accessible. Both attributes are useful for molecular storage applications because the high accessibility allows for facile molecular diffusion through the medium and the high surface area provides sufficient real estate at which desirable surface-molecule interactions may occur.

For the purposes of hydrogen storage, as used herein, highly accessible is generally used to mean a structure with channels, gaps, openings and/or other spacing between the nanostructures within the nanostructure mat. Suitable spacing between nanostructures, for example, can be at least about 3 Å on average. In other applications, the interstitial spacing can be approximately 1-20 Å, and more specifically about 2-5 Å. As used herein, a high surface area generally means a surface with at least 10 $m^2$ of surface for every gram of material, and more specifically of 100 $m^2$-2,000 $m^2$ per gram of material, and still more specifically about 150 $m^2$-300 $m^2$ per gram (e.g., about 200 $m^2/g$).

FIG. 1 illustrates an embodiment of individual nanostructures comprising nanometer-scale wires or springs wherein each wire of spring is between about 1 nm and 1000 nm in diameter. In some cases nanostructures may be bundled together (e.g. coiled or twisted around one another). The length of any one nanostructure may vary greatly. The nanostructures are grown in a manner that generates surfaces with many nanostructures in close proximity resulting in the formation of a nanostructure mat. Within the nanostructure mat, individual nanostructures may or may not demonstrate an ordering. In most cases the nanostructures form a mat of interwoven nanostructures demonstrating a high degree of disorder.

The thickness, dimensions, surface coverage density, and other parameters of the nanostructure mats may all be varied for a particular implementation employing methodology disclosed in International Application No. PCT/US06/024435. In some implementations, only a portion of a substrate surface is coated with the nanostructure mat; this can be independently controlled during the process of forming the nanostructures.

Many different types of substrates and substrate structures can be used because the nanostructure mats may be grown on any surface capable of withstanding the conditions for growing the nanostructures. The synthesis conditions for forming the nanostructures are a function of the physical properties of the precursor materials, and thus potential substrate materials suitable for one particular nanostructure composition may not be suitable for another. The substrates can also have suitable shapes for hydrogen storage applications. Substrates with a large surface area on which nanostructure mats may be grown are generally desired. For example, honeycomb structured substrates, coils or coiled substrates, undulated substrates and/or substrates containing a variety of folds and bends are suitable. Alternatively, simple planar or other non-intricate substrate structures may also be used. As explained in detail below, one or more substrate structures coated at least in part by nanostructure mats can be contained in a gas tight container that can be controlled to continually regulate the gas pressure, composition and temperature within the container.

In several specific embodiments, the nanostructure mats comprise either nanosprings or nanowires composed of glass (e.g., $SiO_2$), ceramics (e.g., SiC, BN, $B_4C$, $Si_3N_4$), ceramic oxides (e.g., $Al_2O_3$, $B_2O_3$, $ZrO_2$), or compositions providing nanostructures wherein the chemical bonding within the nanostructure has a desirable ionic component. For example, the ionic character in the chemical bonding within the nanostructures preferably promotes non-disassociative hydrogen-nanostructure interactions. Generally covalent bonding interactions within a surface leads to weak local electric fields at the surface. In contrast to covalent bonding, ionic bonding produces larger electric fields near the surface of materials. In some cases, a large local electric field may induce a dipole moment within molecular hydrogen, thereby making a non-disassociative hydrogen-nanostructure interaction more favorable.

Several embodiments of the inventive nanostructure mats provide surfaces that enable more than one layer of hydrogen molecules to adsorb onto the nanostructures. More specifically, the present inventors have discovered that more than one layer of hydrogen adsorbs onto $SiO_2$ nanosprings or nanocoils. The present inventors, more specifically, believe that $SiO_2$ nanosprings have a unique ionization state that produces a surface which promotes bonding with hydrogen. As explained in more detail below, the curved or bent structures of nanosprings or nanocoils have an intermediate ionization state that is typically less than the standard $Si^{4+}$ ionization state for $SiO_2$ (e.g., $Si^{3+}$—$Si^{3.5+}$). This creates a sufficiently strong electrical field at the surface of the $SiO_2$ nanosprings to attract a first layer of hydrogen to the surface of the nanosprings and at least a portion of a second layer of hydrogen to the first layer of hydrogen. As one or more additional layers of hydrogen build on the first layer of hydrogen, the attraction force attenuates such that the outer surface of the hydrogen molecules tends to act more like a natural ionization state for $SiO_2$ (e.g., $Si^{4+}$). The $SiO_2$ nanosprings accordingly enable multilayered hydrogen formations on high density, high surface area nanostructure mats that effectively increase the density of hydrogen storage. Moreover, as explained in more detail below, the multilayered hydrogen formations can be created at normal ambient temperatures, and the hydrogen can be desorbed at controlled rates at temperatures less than 100° C. Therefore, it is expected that nanostructure mats formed from a plurality of $SiO_2$ nanosprings or nanocoils will provide significantly higher densities of hydrogen storage that can be dispensed at controlled rates in many transportation and other widespread applications.

More specifically, a nanostructure mat composed of $SiO_2$ nanosprings can provide a high surface area (~200 m$^2$/g) that has a high degree of accessibility. Assuming $H_2$ molecules are randomly and closely packed into a two-dimensional monolayer, a maximum theoretical gravimetric storage capacity of $H_2$ for monolayer adsorption on silica nanosprings is about 3.6% with a kinetic size of $H_2$ of d=0.289 nm. This value would correspond to a volumetric capacity of 58.2%. Because $SiO_2$ nanosprings are well suited for multilayer non-disassociative adsorption of hydrogen, they can provide an increase in this practical capacity.

Figure 2:
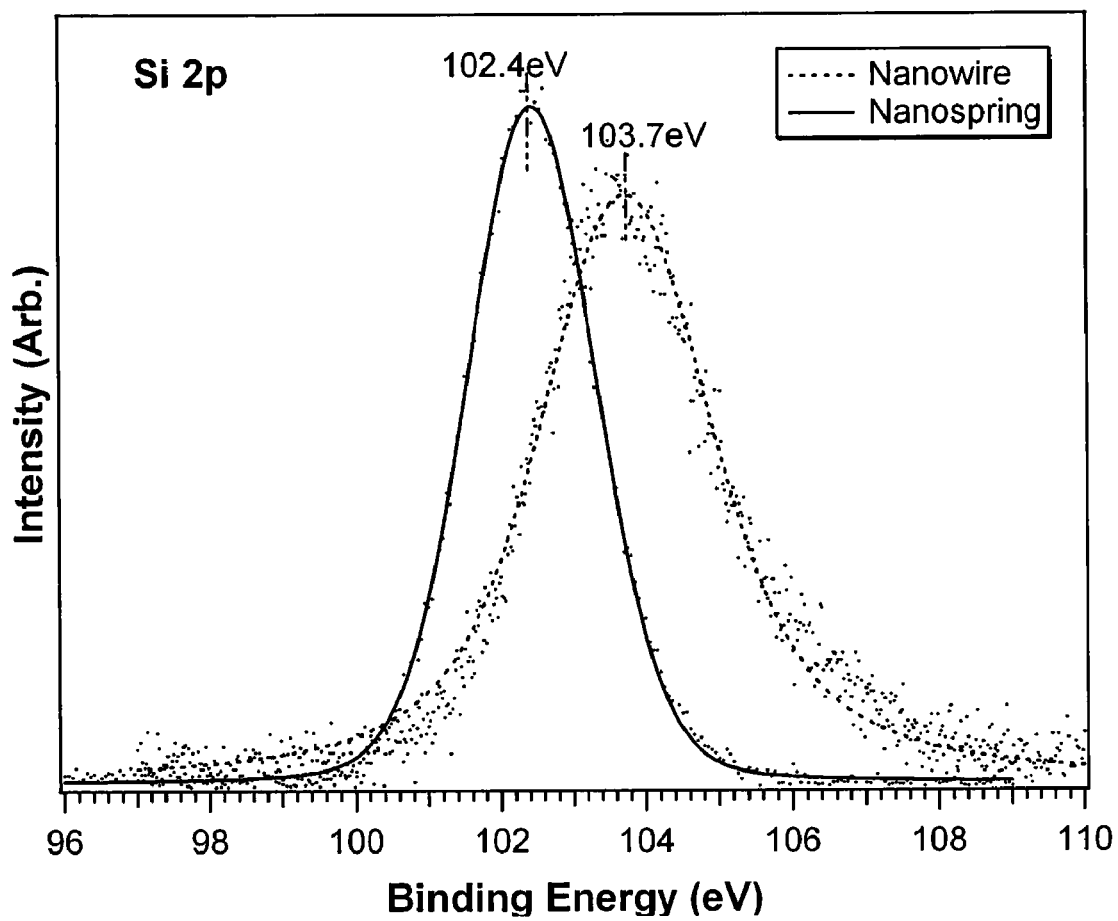
FIG. 2 is a graph showing XPS spectra of the Si 2p core level state of silica nanosprings (solid line) and silica nanowires (dashed line) in which the points are experimental data and lines are fits of experimental data.

The capacity to non-disassociatively adsorb multiple layers of hydrogen is demonstrated with reference to FIGS. 2-5. FIG. 2 is a graph illustrating the binding energy of an $SiO_2$ nanowire compared to that of an $SiO_2$ nanospring. The X-ray photoelectron spectroscopy (XPS) shows that the binding energy of the Si 2p core level state of nanowires is at 103.70 eV, which is almost equivalent to $SiO_2$ and corresponds to an $Si^{4+}$ oxidation state. In contrast, the binding energy of the Si 2p core level of the nanosprings is 102.85 eV, which is indicative of an intermediate ionization state between $Si^{3+}$ (100.02 eV) and $Si^{4+}$. Relative to $SiO_2$ films and linear nanowires, the surface stoichiometry of the nanosprings results in a unique ionization state of the Si sites. This unique ionization state derives from the specific silicon-oxygen bonding interaction, and it promotes multilayered hydrogen adsorption via bonding. FIG. 3A is a series of plots showing the bonding energy at increased dosing steps performed at room temperature. FIG. 3A shows that $H_2$ adsorption shifts the Si 2p to lower binding energies, which is indicative of electron charge redistribution. Although the ionization state is still mixed, the shift moves toward the $Si^{3+}$ state which suggests that surface charge redistribution is to Si. Upon subsequent exposure to higher pressures of hydrogen, there is a shift back toward the $Si^{4+}$ state. These data clearly show that multilayered adsorption of hydrogen occurs with nanostructure mats of $SiO_2$ nanosprings. Moreover, materials of similar composition, such as ceramics (e.g., SiC, BN, $B_4C$, $Si_3N_4$) or ceramic oxides (e.g., $Al_2O_3$, $B_2O_3$, $ZrO_2$), are anticipated to demonstrate similar characteristics when subject to the appropriate geometric and electronic constraints.

In addition to providing multilayered adsorption, the hydrogen can be completely desorbed from the surface of the nanostructure springs by heating the substrate material to temperatures as low as 100° C. In several implementations, heating elements may be controlled to modulate the temperature of the substrate and thereby control the amount of hydrogen released from the nanostructures.

In one specific example, silica nanosprings were synthesized in a standard tubular furnace that is operated at temperatures as low as 325° C. and atmospheric pressure. The nanosprings were grown via the vapor-liquid-solid (VLS) mechanism, which was facilitated by the presence of gold nanoparticle catalysts. The nanosprings can be grown on a variety of substrates, including polyimides or other polymers. The only requirement is that the substrate can withstand the process temperature and chemicals. For example, in one application, the nanosprings were grown on single-crystal Si substrates to form a nanostructure mat having a surface area of approximately 200 m$^2$/g.

Figure 3A:
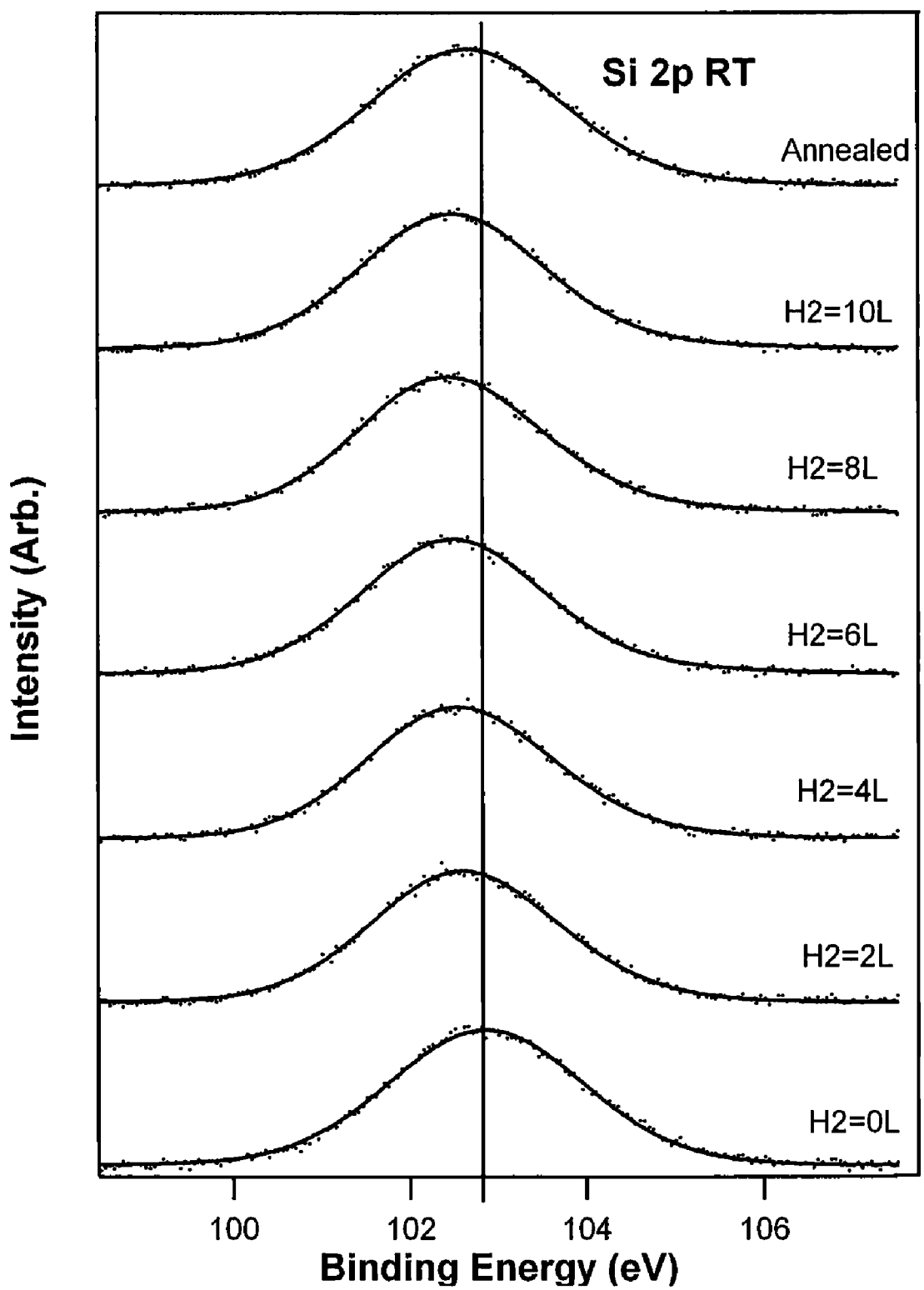
FIGS. 3A and 3B are graphs showing Si 2p XPS spectra of silica nanosprings as a function of $H_2$ exposure at room temperature (FIG. 3A) and 77° K (FIG. 3B).
Figure 3B:
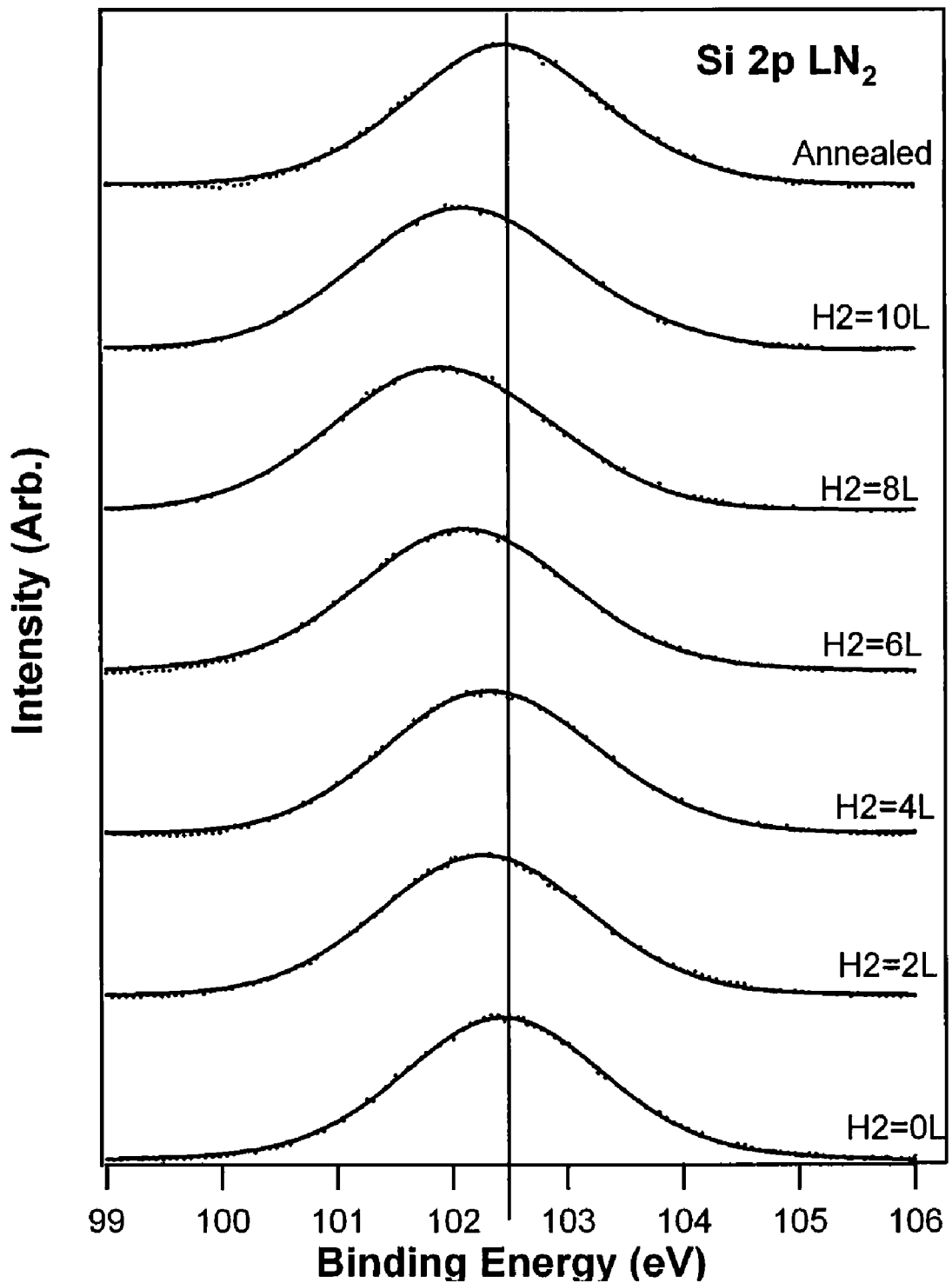

X-ray photoelectron spectroscopy (XPS) on the silica nanosprings was performed in conjunction with $H_2$ adsorption in order to determine whether $H_2$ adsorbs dissociatively or molecularly, and if so whether the process one of chemisorption or physisorption. Since hydrogen cannot be measured directly with XPS, the chemical shifts of the Si 2p and O 1s core levels were used to characterize the $H_2$ adsorption mechanism. The XPS data were acquired in a vacuum chamber, with a base pressure of $5\times10^{-10}$ torr, using the Mg Kα emission line (1253 eV) and a hemispherical energy analyzer with a resolution of 0.025 eV. During XPS acquisition the samples were bombarded by an electron flood gun to eliminate sample charging. The sample could be radiatively heated or cooled by liquid nitrogen in situ. The temperature was determined using a thermocouple in direct contact with the sample. Ultra high purity $H_2$ (99.9999%) was leaked into the vacuum chamber at a pressure of $1\times10^{-8}$ torr, where the exposure is given in units of Langmuirs (1 L=$10^{-6}$ torr-s). A series of $H_2$ adsorption studies were carried out at room temperature as shown in FIG. 3A and at liquid $N_2$ ($LN_2$) temperature (77° K) as shown in FIG. 3B. XPS spectra were acquired at each temperature after each exposure to $H_2$. Adsorption sequences for the two temperatures were obtained from two different regions of the sample, with 2 L dosing steps in the first region and 5 L dosing steps in the second region.

The initial rationale for using silica nanosprings as a hydrogen storage medium was their large surface area, which is clearly demonstrated in FIG. 1. However, examination of the nanosprings with XPS also revealed that they have advantageous electronic properties relative to other forms of silica as described above with reference to FIG. 2.

The binding energy shifts of the Si 2p and O 1s core levels have been used as a qualitative measure of $H_2$ adsorption capacity, as well as to determine the adsorption sites, i.e., Si, O or both sites. Thermal stimulated desorption of $H_2$ from the surface of the nanosprings was used in conjunction with the core level shifts to determine if $H_2$ is chemi- or physisorbed onto the nanospring surface. As described above, FIG. 3A is a montage of the XPS spectra of the Si 2p core level as a function of room temperature exposures to $H_2$. The dots represent the experimental data and the solid lines are fits to the data using a Voigt function convoluted with a Lorenztian function. The binding energy of the Si 2p core level as a function of $H_2$ is plotted in FIG. 4A. The largest single shift of the Si 2p state occurs with the first exposure of 2 L $H_2$ (230 meV) and continues at a slower rate upon subsequent exposures until a maximum shift of 380 meV at 8 L $H_2$. The Si 2p core level shifts back to higher binding energies at 10 L of $H_2$, which indicates the completion of a monolayer and the formation of a second layer.

To determine if $H_2$ dissociatively adsorbs at room temperature, as well as to determine the desorption energy from the surface of the nanosprings, the sample exposed to 10 L $H_2$ was annealed at 373° K. The corresponding Si 2p core level spectrum is plotted at the top of FIG. 3A. After annealing, the Si 2p core level state shifts by 160 meV from 102.49 eV (10 L $H_2$) to 102.65 eV, but does not return to the initial value of 102.85 eV. This result suggests that the majority of the hydrogen desorbs, but residual amounts remain. Annealing at temperatures up to 673° K did not remove all the remaining hydrogen, which would indicate that $H_2$ is initially dissociatively adsorped and that subsequent adsorption is molecular. Repeated cycling with 5 L dosing step (data shown in FIG. 4A with square symbols) between 10 L of $H_2$ exposure followed by annealing resulted in Si 2p core level shifts between 102.5 eV and 102.65 eV. The low desorption $H_2$ temperature of 373° K is 500° K lower than the reported desorption temperature of $H_2$ from single walled carbon nanotubes (SWCNT). This is particularly useful because it reduces the temperature requirements for desorption to levels that are suitable for transportation and consumer applications. Furthermore the full width at half maximum (FWHM) of the Si 2p core level spectrum upon annealing (hydrogen desorption) in FIG. 3A is effectively equivalent to that of the pristine nanosprings. For SWCNT the FWHM of the C 1s core level state upon annealing at 873° K was significantly broader relative to pristine SWCNT, which suggests that molecular hydrogen dissociates to atomic hydrogen and a significant amount of atomic hydrogen remains attached to the surface. The results presented here for $H_2$ adsorption on silica nanosprings, and subsequent relatively low temperature desorption, indicate that silica nanosprings are a superior hydrogen storage media relative to SWCNT.

The preceding observations suggest that the $H_2$ adsorption rate is larger for initial exposures and decreases with subsequent exposures. The minimum binding energy of the Si 2p core occurs at an exposure of 8 L, and then shifts by 30 meV from 102.47 eV to a binding energy of 102.50 eV with two more Langmuirs exposure, for a total exposure of 10 L $H_2$. This result suggests that the completion of a monolayer of $H_2$ occurs with an expose of 8 L. Furthermore, the shift of the Si 2p core level to higher binding energies for exposures exceeding 8 L is indicative of the formation of a second monolayer of $H_2$. This conclusion is supported by studies of $H_2$ adsorption on porous Vycor glass, another form of high-purity $SiO_2$ glass, where it was found that the first monolayer was very strongly bonded to the glass surface, while the adsorption energy between the second monolayer and the first monolayer was relatively weaker. The results of our study of room temperature adsorption of $H_2$ on silica nanosprings predicts a gravimetric capacity exceeding 5% (assuming that only 2 monolayers form; additional adsorption would produce even greater storage capacities). In the present system, the second layer of $H_2$ adsorption produces a surface charge redistribution where the ionization state of the Si sites is shifted back towards that of the pristine surface, i.e., an increase of the binding energy of Si 2p core level for 10 L exposure of $H_2$.

Figure 4A:
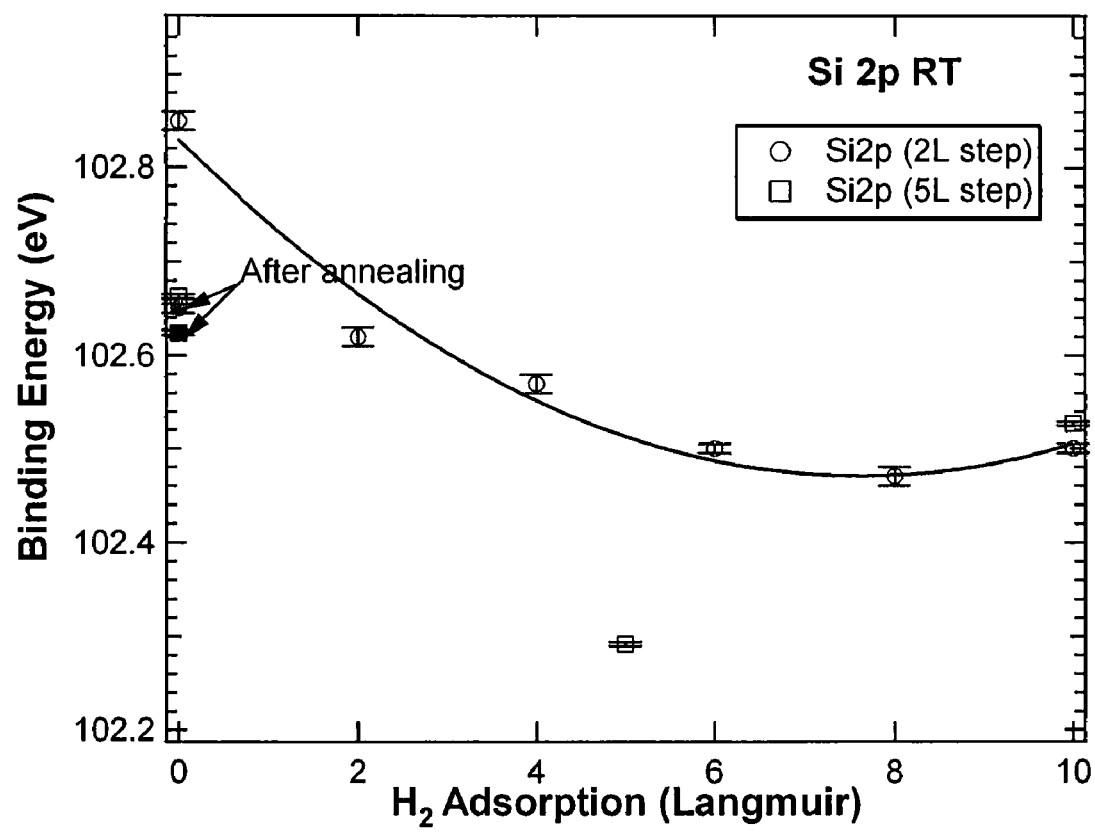
FIGS. 4A and 4B are graphs showing the binding energy of the Si 2p core level state as a function of $H_2$ adsorption at room temperature (FIG. 4A) and 77° K (FIG. 4B) in which the solid lines are merely a guide for the eye.
Figure 4B:
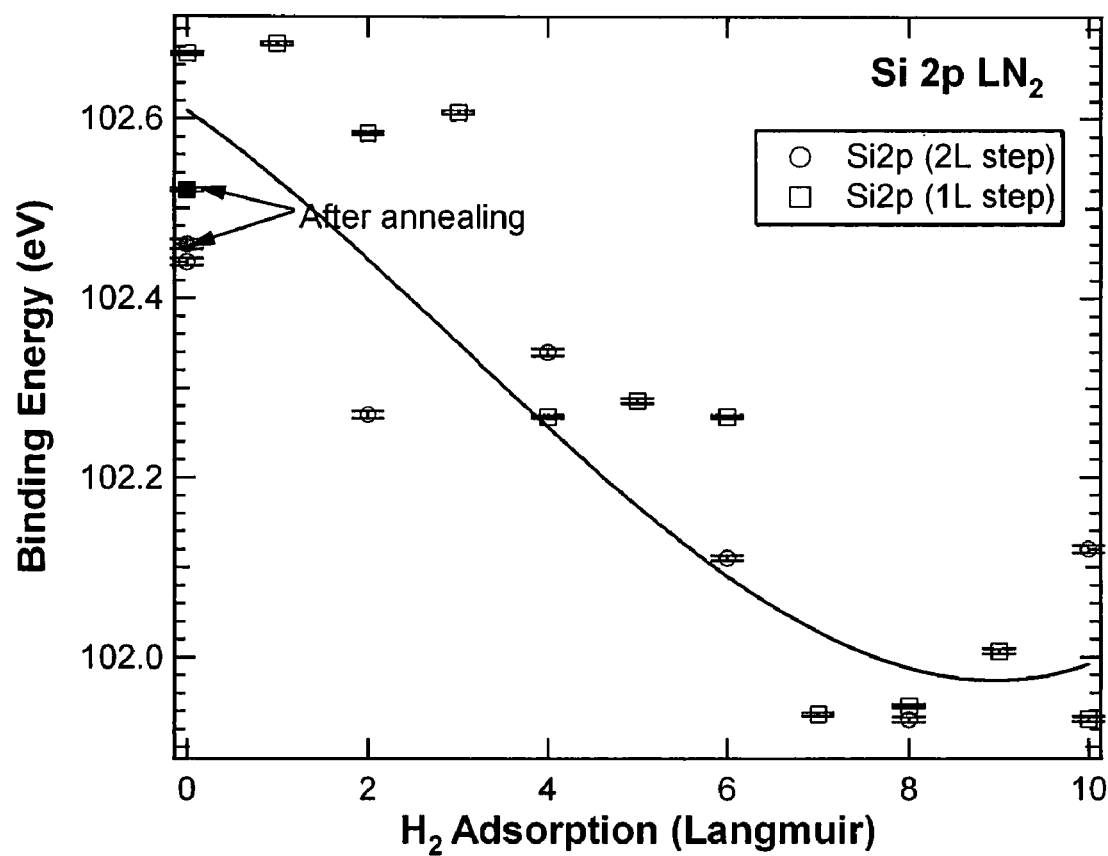

In order to demonstrate the temperature dependence of isobaric adsorption of $H_2$ onto the nanosprings, samples were cooled to 77° K and $H_2$ adsorption experiments were conducted using the procedure used for room temperature adsorption. FIG. 3B is a graph showing plots of the XPS spectra of the Si 2p core level state as a function of $H_2$ exposure at 77° K for different dosing. FIG. 4B is a plot of the Si 2p core level binding energy as a function of $H_2$ exposure doses of 1 L and 2 L. Comparing the data in FIGS. 4A and 4B, the shift of the Si 2p core level states with $H_2$ adsorption exhibit similar trends. However, for adsorption at $LN_2$ temperature the binding energy shift of the Si 2p is significantly larger. For example, at 8 L $H_2$ exposure the shift is 510 meV at $LN_2$ temperature, compared to 380 meV at room temperature, where 2 L dosing steps were used for both experiments. Physisorption is typically enhanced at lower temperatures due to decreased phonon-adsorbate interactions. With a subsequent $H_2$ exposure of 2 L, for a total of 10 L, the binding energy of Si 2p shifts back by 190 meV to a higher binding energy. A similar shift of 30 meV was observed at 10 L of $H_2$ at room temperature. Thus, a second monolayer of $H_2$ begins to form at room temperature and an $LN_2$ temperature, and the sticking coefficient for the second monolayer increases with decreasing temperature.

Figure 5:
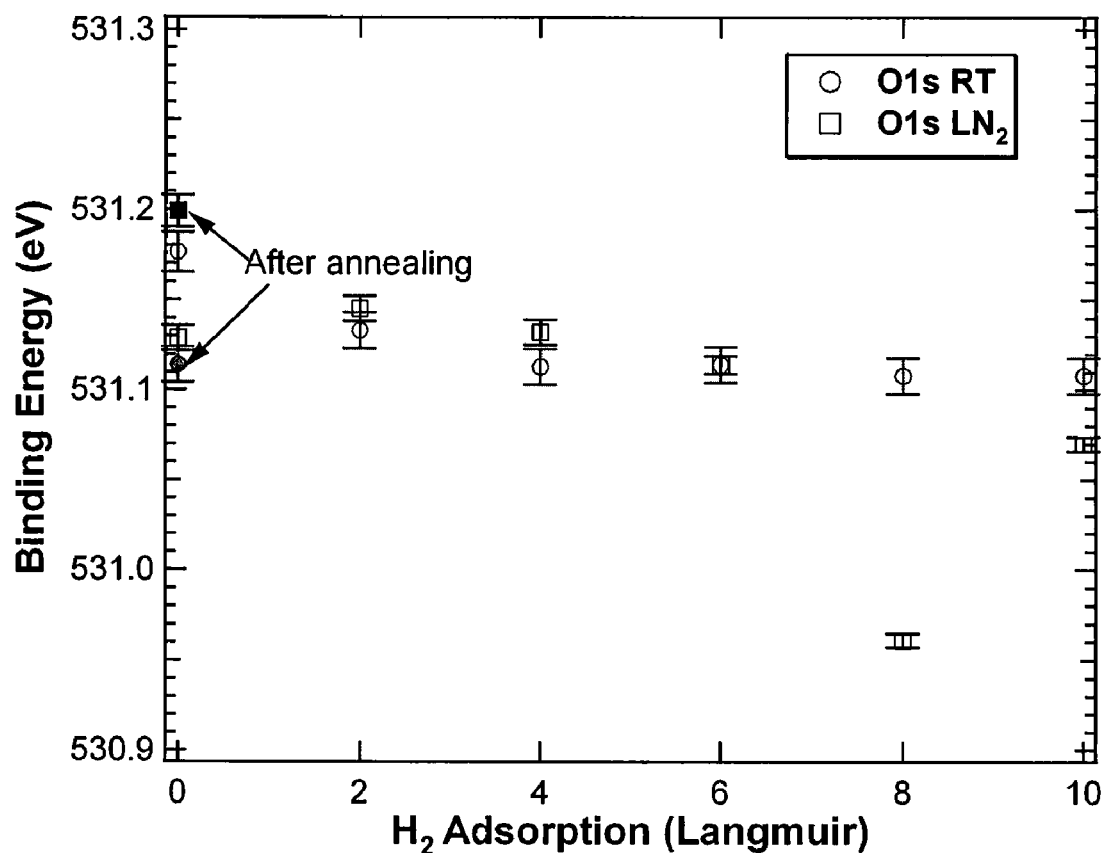
FIG. 5 is a graph showing the binding energy of the O 1s core level state as a function of $H_2$ adsorption at room temperature (○) and 77° K (□).

The O 1s spectra are not shown for the sake of brevity, but core level shift of the O 1s as a function of room temperature $H_2$ exposure is plotted in FIG. 5. The average value of the binding energy of the O 1s as function of exposure is 530.99±0.01 eV. Other than an anomalous shift at 8 L, the O 1s core level state is unaffected by $H_2$ adsorption. This, in conjunction with the shift of the Si 2p core level state, suggests that charge redistribution is due to the interaction of the adsorbed $H_2$ with the Si surface sites. However, O surface sites cannot be precluded in redistribution of surface charge.

Referring still to FIG. 5, the behavior of the O 1s core level state as a function of $LN_2$ temperature adsorption of $H_2$ is equivalent to room temperature adsorption; as such, there is no obvious effect on the O 1s binding energy. The average values are 530.99±0.01 eV for O 1s under room temperature and 531.00±0.04 eV under liquid nitrogen temperature. These observations further indicate that hydrogen is primarily associated with the Si sites on the nanospring surface.

Thermal annealing of the nanosprings with 10 L of $H_2$ to 100° C. causes a shift of the Si 2p core level state back to the original binding energy (102.5 eV) prior to $H_2$ exposure (FIG.

3B). Once again we can conclude that the adsorbed hydrogen molecularly desorbs. This desorption temperature is approximately 400% higher than that of carbon (e.g., 80° K). As a result, nanosprings provide a practical storage media for $H_2$ because the heat required for releasing $H_2$ can be obtained from the heat generated by the exhaust of a combustion engine and/or a heating element.

In conclusion, glass nanosprings offer a superior alternative to nanostructured forms of carbon for hydrogen storage both at room and liquid nitrogen temperatures. Multilayer physisorption of hydrogen on Si sites at the nanospring surface was verified by XPS. Our results indicate that gravimetric storage capacities of hydrogen exceed 5% at room temperature and are even higher at 77° K. In addition, the low (100° C.) desorption temperature of $H_2$ from the surface of the nanosprings is superior to that reported for carbon nanoubes and favors quick release of stored hydrogen. Collectively, these observations lead to the conclusion that silica nanosprings, a unique form of nanostructured glass, are well suited for hydrogen storage.

C. Embodiments of Systems and Methods for Storing Hydrogen

FIG. 6 is a schematic cross-sectional view of storage apparatus 100 for storing hydrogen in accordance with an embodiment of the invention. In this embodiment, the apparatus 100 has a substrate 110 with a hexagonal shape. The substrate 110 can be substantially planar or have other configurations in other embodiments (e.g., rectilinear, cylindrical, or other configurations). The apparatus further includes a nanostructure mat 120 having a plurality of individual nanostructures 122. As explained above, the nanostructures 122 can be nanosprings or other types of nanocoils composed of one or more materials that have a desired ionization state at the surface to promote multilayered adsorption of hydrogen onto the nanostructures 122. In specific embodiments, the nanostructures 122 are silicon oxide nanosprings, but the nanosprings can be composed of ceramics or ceramic oxides in other embodiments. The apparatus 100 can further include an activator 130 for imparting energy to the nanostructures 122 to desorb hydrogen from the nanostructure mat 120. In one embodiment, the activator 130 can be a heating element that heats the substrate 110 to a temperature at which hydrogen can be controllably desorbed from the nanostructure mat 122 for delivery to a device that uses the hydrogen as fuel. The activator 130, for example, can be an electrical heating element and/or a chamber through which heated gases pass over the outer surface of the substrate 110.

FIG. 7 is a schematic cross-sectional view of a storage system 200 having a container 210 with an inlet 212 and an outlet 214. The storage system 200 can further include a plurality of the storage apparatus 100 in the container 210. As shown in FIG. 7, the storage apparatus 100 can be arranged in a honeycomb configuration that provides a high density of nanostructure mats 120 within the container 210. The individual storage apparatus 100 in the container 210 can optionally include activators, such as the activator 130 shown in FIG. 6, to drive desorption of hydrogen molecules from within the container 210. The storage system 200 can optionally include one or more external activators 210 in addition to or instead of the optional activators 130 of the storage apparatus 100. The external activators 220 can be electrical heating elements, gas chambers for containing heated gases, or other suitable devices that impart a suitable energy modality to the hydrogen molecules on the surfaces of the nanostructure mats 120. In one specific example, the activators 220 can be gas chambers operably coupled to the exhaust of a combustion engine or air heated by the combustion engine to heat the external surface of the container 210.

The storage system 200 operates by injecting hydrogen into the container 210 through the inlet 212. To deliver gas from the container 210, the activators 130 and/or 200 can impart energy to desorb hydrogen from the nanostructure mats 120. The desorbed hydrogen can pass through the outlet 214 to a combustion engine, fuel cell, or other device that uses hydrogen for energy. In a typical application, the activators 130 and/or 200 control the temperature of the apparatus 100 to provide a desired desorption rate of hydrogen for delivery through the outlet 214. When the nanostructure mats 120 are composed of silicon oxide nanosprings, the activators 130 and/or 200 can heat the nanostructure mats 120 to a temperature less than 100° C. for sufficient desorption of the hydrogen.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method for storing hydrogen, comprising:
providing a storage apparatus having a substrate and a nanostructure mat on at least a portion of a side of the substrate, wherein the nanostructure mat comprises a plurality of nanostructures individually having a surface with a surface ionization state less than a natural ionization state of the individual nanostructures, wherein the surface ionization state causes more than one layer of hydrogen to adsorb onto the surface of the individual nanostructures; and
exposing the nanostructure mat to hydrogen such that more than one layer of hydrogen adsorbs onto the surface of the individual nanostructures.

2. The method of claim 1 wherein the nanostructures comprise silicon oxide nanosprings, and exposing the nanostructure mat to hydrogen comprises adsorbing more than one layer of hydrogen onto the nanosprings at an ambient temperature.

3. The method of claim 1, further comprising desorbing the hydrogen from the nanostructures at a temperature of about −50° C. to about 100° C.

4. The method of claim 1 wherein the nanostructures comprise nanosprings composed of at least one of glass, ceramics and/or ceramic oxides.

5. The method of claim 1, wherein exposing the nanostructure mat to hydrogen comprises flowing hydrogen onto the mat at approximately an ambient temperature.

6. An apparatus for storing hydrogen, comprising:
a substrate; and
a nanostructure mat covering at least a portion of the substrate, wherein the nanostructure mat comprises nanostructures individually having a surface with a surface ionization state less than a natural ionization state of the individual nanostructures, the surface ionization state causes more than one layer of hydrogen to adsorb onto the nanostructures when exposed to a gas containing hydrogen.

7. The apparatus of claim 6 wherein the nanostructures comprise nanosprings or nanocoils.

8. The apparatus of claim 6 wherein the nanostructures comprise nanosprings composed of at least one of silicon oxide, a ceramic, and/or a ceramic oxide.

9. The apparatus of claim 6 wherein the substrate is hexagonal and the nanostructure mat covers at least a portion of an interior surface of the substrate.

10. The apparatus of claim 6 wherein the substrate is a tube having a rectilinear, polygonal, circular, or curved cross-sectional shape and the nanostructure mat covers at least a portion of an interior surface of the tube.

11. The apparatus of claim 6, further comprising an activator configured to impart an energy to the nanostructure mat to thereby desorb hydrogen from the nanostructures.

12. The apparatus of claim 11 wherein the activator comprises a heating element at the substrate.

13. The apparatus of claim 11 wherein the nanostructure mat is at a first side of the substrate and the activator comprises a chamber configured to direct heated gas across a second surface of the substrate spaced apart from the first surface of the substrate.

14. A system for storing hydrogen, comprising:
a container; and
a hydrogen storage apparatus in the container, wherein the hydrogen storage apparatus includes a substrate and a nanostructure mat covering at least a portion of the substrate, and wherein the nanostructure mat comprises nanostructures individually having a surface ionization state less than a natural ionization state of the individual nanostructures, the surface ionization state causes more than one layer of hydrogen to adsorb onto the surface of the individual nanostructures.

15. The apparatus of claim 14 wherein the nanostructures comprise nanosprings and/or nanocoils.

16. The apparatus of claim 14 wherein the nanostructures comprise nanosprings composed of at least one of silicon oxide, a ceramic, and/or a ceramic oxide.

17. The apparatus of claim 14 wherein the substrate is hexagonal and the nanostructure mat covers at least a portion of an interior surface of the substrate.

18. The apparatus of claim 14 wherein the substrate is a tube having a rectilinear, polygonal, circular, or curved cross-sectional shape and the nanostructure mat covers at least a portion of an interior surface of the tube.

19. The apparatus of claim 14, further comprising an activator configured to impart an energy to the nanostructure mat to thereby desorb hydrogen from the nanostructures.

20. The apparatus of claim 19 wherein the activator comprises a heating element at the substrate of the hydrogen storage apparatus.

21. The apparatus of claim 19 wherein the activator comprises a chamber through which a heated gas can pass across a surface of the substrate.

22. The apparatus of claim 19 wherein the activator comprises a heating element at a surface of the container.

23. The apparatus of claim 19 wherein the activator comprises a chamber through which a heated gas can pass across a surface of the container.

24. A method for reversibly holding hydrogen, comprising:
exposing a gas containing hydrogen with a storage device, the storage device having a substrate and a plurality of nanostructures on at least a portion of the substrate, the nanostructures individually having an external surface with a surface ionization state less than a natural ionization state of the individual nanostructures; and
adsorbing a layer of hydrogen onto the external surface of the individual nanostructures, wherein the adsorbed layer of hydrogen causes the surface ionization state of the individual nanostructures to shift toward the natural ionization state.

25. The method of claim 24, wherein the layer of hydrogen is a first layer of hydrogen, and wherein the method further comprises adsorbing a second layer of hydrogen onto the first layer of hydrogen, and further wherein the second layer of hydrogen causes the surface ionization state of the individual nanostructures to shift closer toward the natural ionization state than the first layer of hydrogen.

26. The method of claim 24, further comprising desorbing at least some of the hydrogen from the nanostructures at a temperature of about −50° C. to about 100° C.

27. The method of claim 24 wherein exposing a gas includes exposing a gas containing hydrogen with a storage device, the storage device having a substrate and a plurality of silicon oxide ($SiO_2$) nanosprings on at least a portion of the substrate, the silicon oxide ($SiO_2$) nanosprings individually having an external surface with a surface ionization state less than a natural ionization state of the individual silicon oxide ($SiO_2$) nanosprings.

28. The method of claim 24 wherein exposing a gas includes exposing a gas containing hydrogen with a storage device, the storage device having a substrate and a plurality of silicon oxide ($SiO_2$) nanosprings on at least a portion of the substrate, the silicon oxide ($SiO_2$) nanosprings individually having an external surface with a surface ionization state between $Si^{3+}$ and $Si^{3.5+}$.

* * * * *

UNITED STATES PATENT AND TRADEMARK OFFICE
CERTIFICATE OF CORRECTION

PATENT NO. : 7,771,512 B2
APPLICATION NO. : 11/961928
DATED : August 10, 2010
INVENTOR(S) : Grant Norton et al.

It is certified that error appears in the above-identified patent and that said Letters Patent is hereby corrected as shown below:

In column 1, line 22, delete "EPSToR" and insert -- EPSCoR --, therefor.

In column 7, line 24, delete "Lorenztian" and insert -- Lorentzian --, therefor.

In column 9, line 16, delete "nanoubes" and insert -- nanotubes --, therefor.

Signed and Sealed this

Ninth Day of November, 2010

David J. Kappos
*Director of the United States Patent and Trademark Office*